(12) United States Patent
Katakami

(10) Patent No.: US 6,677,542 B2
(45) Date of Patent: Jan. 13, 2004

(54) TOUCH PANEL

(75) Inventor: Seiki Katakami, Gunma (JP)

(73) Assignee: Hosiden Corporation, Hosiden (JP)

( * ) Notice: Subject to any disclaimer, the term of this patent is extended or adjusted under 35 U.S.C. 154(b) by 0 days.

(21) Appl. No.: 10/419,284

(22) Filed: Apr. 18, 2003

(65) Prior Publication Data

US 2003/0201155 A1 Oct. 30, 2003

(30) Foreign Application Priority Data

Apr. 26, 2002 (JP) ....................... 2002-126300

(51) Int. Cl.$^7$ ............................................. H01H 13/70
(52) U.S. Cl. .................. 200/5 A; 200/512; 345/173; 178/18.05
(58) Field of Search ............... 178/18.05; 200/5 A, 200/600, 511, 512; 345/173, 174

(56) References Cited

U.S. PATENT DOCUMENTS

| | | | | |
|---|---|---|---|---|
| 4,644,101 A | * | 2/1987 | Jin et al. | 178/18.05 |
| 4,707,570 A | * | 11/1987 | Ide et al. | 178/18.05 |
| 6,310,614 B1 | * | 10/2001 | Maeda et al. | 345/173 |
| 6,355,895 B1 | * | 3/2002 | Crowley et al. | 200/512 |
| 6,356,259 B1 | * | 3/2002 | Maeda et al. | 345/173 |
| 6,483,055 B1 | * | 11/2002 | Tanabe et al. | 200/85 A |

FOREIGN PATENT DOCUMENTS

| | | | |
|---|---|---|---|
| JP | 9146707 | 6/1997 | G06F/3/033 |
| JP | 1048625 | 2/1998 | G02F/1/1335 |
| JP | 10133817 | 5/1998 | G06F/3/033 |

* cited by examiner

Primary Examiner—Michael Friedhofer
(74) Attorney, Agent, or Firm—David N. Lathrop, Esq.; Gallagher & Lathrop

(57) ABSTRACT

A touch panel comprises a pair of glass substrates (11, 12) each having a transparent conducting, film (13, 14) formed on its one side surface. The glass substrates disposed with their respective transparent conducting films (13, 14) is faced each other and bonded together around their peripheries by a seal (19)having spacers (23') of insulating material incorporated therein, in which lead-out patterns (17e–17d) intersect the seal (19) prior to extending out of the touch panel. The sphere diameter of the spacers (23') is selected to be approximately equal to the particle size of silver particles (21) contained in the conducting paste, whereby the spacers may dig in between the conducting material particles to thereby reduce the difference in height between the bumps and dips on those portions of the seal intersecting the lead-out patterns and the remaining portions, respectively.

4 Claims, 3 Drawing Sheets

TOUCH PANEL

BACKGROUND OF THE INVENTION

1. Field of the Invention

This invention relates to a touch panel disposed at the front of a display for use as a display integrated input switch, and particularly to a glass-glass type touch panel.

2. Description of the Related Art

A well known prior art touch panel of the glass-glass type called resistance film system is disclosed in Japanese Published Patent Applications JA9-146707, 10-48625, and 10-133817.

FIG. 2 illustrates the construction of such the prior art touch panel in which the upper glass side and the lower glass side are shown in an exploded view. As shown, the upper glass substrate 11 is reduced in thickness as compared to the lower glass substrate 12 such that it may be easily deformed upon application of a downward finger pressure. The upper and lower glass substrates 11 and 12 are formed on their opposing surfaces with transparent films 13 and 14, respectively of conducting material.

The transparent conducting films 13 and 14 comprise ITO (Indium Tin Oxide) films or the like to form resistance films and are provided along their opposite edges with electrodes 15a, 15b and 16a, 16b, respectively.

In the illustrated example, the electrodes 16a, 16b provided on the transparent conducting film 14 formed on the lower glass substrate 12 are arranged along the opposite edges in the X direction of the X-Y axes which correspond to two directions orthogonal to each other in a plane parallel to the face of the transparent conducting film 14. On the other hand, the electrodes 15a, 15b provided on the transparent conducting film 13 formed on the upper glass substrate 11 are arranged along the opposite edges in the Y direction of the transparent conducting film 13. The electrodes 15a, 15b are somewhat extended in the X direction beyond one edge of the transparent conducting film 13 to form lead-out ends 15ax, 15bx, as shown in FIG. 2.

Formed on the lower glass substrate 12 are conducting lead-out patterns 17a–17d or voltage application and detection. The lead-out patterns 17a and 17b are connected with the electrodes 16a and 16b, respectively while the lead-out patterns 17c and 17d have their one ends (inner ends) 17cx and 17dx extend so as to oppose to the lead-out ends 15ax, 15bx which are extensions of the electrodes 15a, 15b on the upper glass substrate 11.

As shown, the lead-out patterns 17a–17d extend so as to terminate in their other ends (outer ends) aligned along one side of the lower glass substrate 12 which may be connected with a FPC cable (not shown) or the like for connection with an external circuit.

The electrodes 15a, 15b, 16a, 16b and the lead-out patterns 17a–17d may be formed by print-applying and firing a conducting paste, for which a silver paste is commonly used.

Further, it is to be noted that many dot spacers 18 are formed in an array over the transparent conducting film 14 of the lower glass substrate 12.

The upper glass substrate 11 and the lower glass substrate 12 constructed as described above are integrally bonded together around their peripheries by means of a seal 19 having spacers incorporated therein, with the transparent conducting films 13 and 14 facing each other.

More specifically, the seal 19 comprises spacers of glass fiber or the like incorporated in a matrix of thermosetting resin such as epoxy-based resin and is applied on the lower glass substrate 12 in a frame-like fashion around its outer periphery as shown, on which the upper glass substrate 11 is superposed, followed by pressing and firing the resulting assembly to bond the upper glass substrate 11 and the lower glass substrate 12 together with a predetermined spacing therebetween.

Concurrently with this process, the lead-out ends 15ax, 15bx which are extended ends of the electrodes 15a, 15b on the upper glass substrate 11 and the opposing inner ends 17cx, 17dx of the lead-out patterns 17c, 17d on the lower glass substrate 12 are connected together by a conducting paste.

In addition, a notched portion 19a provided in the frame-like seal 19 is used as an air inlet for injecting air to bulge the central portion of the upper glass substrate 11 (increase the spacing from the lower glass substrate) after bonding the upper and lower glass substrates 11 and 12 together, and once the air has been injected, the notched portion is sealed.

The touch panel constructed as described above is configured such that a depressing operation on the touch panel at any point thereof will bring the transparent conducting films 13 and 14 into contact with each other at the depressed point so that when a voltage is applied to the electrodes 16a, 16b of the transparent conducting film 14 which is a resistance film at the opposite ends thereof, the potential of which is detected through the transparent conducting film 13 to determine the X coordinate of that point while in the same manner, when a voltage is applied to the electrodes 15a, 15b of the transparent conducting film 13 at the opposite ends thereof, the potential of which is detected through the transparent conducting film 14 to determine the Y coordinate of that point. The X and Y coordinates of that depressed point may thus be determined.

Heretofore, however, the well known touch panel having the construction as described above has had the disadvantage that it is quite susceptible to cracks in the relatively thin upper glass substrate 11 when the upper glass substrate 11 and the lower glass substrate 12 are bonded together by a seal 19, resulting in being rejected as defective parts, and hence reduced yields.

As a result of researching into the causes of frequent occurrence of such cracking, the present inventor has reached the conclusion that it may be ascribable to the facts that the conducting lead-out patterns 17a–17d intersect the seal 19 before extending outside to form intersections (overlapping portions) and that rod-like (columnar) glass fibers has heretofore been used as spacers to be admixed into the seal 19. The situation in which the glass cracking incidental to the prior art example illustrated occurs will be specifically explained by exampling numerical values as follows:

Now assume that the spacing between the upper and lower glass substrates 11 and 12 around their periphery (seal joint) is 9 μm. In this instance, glass fibers on the order of 9 μm in diameter (φ) and 30–50 μm in length have heretofore been used as spacers. That is, such glass fibers have been admixed into thermosetting resin such as epoxy-based resin to form a seal 19.

On the other hand, the lead-out patterns 17a–17d are formed of a silver paste, which contains silver particles with particle size of 10 μm or less, say about 6 μm.

FIG. 3 is an illustration showing the manner in which an upper glass substrate 11 is superposed on a lower glass substrate 12 with a seal 19 interposed therebetween, in which that portion of a lead-out pattern 17a intersecting the seal is diagrammatically shown. Specifically, a silver paste having silver particles as described above incorporated therein is print-applied and fired on a lower glass substrate 12 to form lead-out patterns (only a lead-out pattern 17a is shown in FIG. 3) to a thickness of 8–12 μm as measured in a direction perpendicular to the plane of the drawing (X direction in FIG. 2), and then a seal 19 containing therein spacers in the form of glass fibers of 9 μm in diameter (φ) and 30–50 μm in length as described above being applied around the lower glass substrate 12 in parallel to the plane of the drawing (Y direction in FIG. 2) so as to intersect the lead-out patterns, followed by an upper glass substrate 11 being superposed on the lower glass substrate 12 over the seal and the lead-out patterns. In the drawing, the reference numeral 21 indicates the silver particles; 22 the cured resin of the silver paste; 23 the spacers comprising the glass fibers; and 24 the resin matrix of the seal 19.

As is apparent from FIG. 3, due to the rod-like configuration elongated as compared with the diameter, the spacer 23 overlies the silver particles 21 whereby the thickness of that portion of the seal 19 intersecting the lead-out pattern 17a amounts up to about 20 μm whereas the thickness of those portions of the seal 19 not intersecting the lead-out pattern 17a is about 9.5 μm substantially corresponding to the diameter of the spacer 23. It will be appreciated that the difference in the thickness or height between the two different portions may be as great as 11.5 μm, resulting in formation of bumps and dips on the seal. In such condition, when the pressure is applied to the upper glass substrate 11 while the seal 19 is being fired, the pressing forces will be concentrated on the bumps, that is, stress concentration will occur locally on the bumps, leading to a high incidence of cracks in such bumps.

SUMMARY OF THE INVENTION

With a view to overcoming the foregoing problem, it is an object of this invention to provide a touch panel which is configured to prevent the occurrence of cracking during the bonding of the upper and lower glass substrates together to thereby significantly improve the manufacturing yield.

In accordance with a first aspect of the present invention, in the touch panel of the type described above, lead-out patterns are formed from a conducting paste containing particles of conducting material, such as silver particles, and spacers incorporated in a seal comprise spherical particles of electrically insulating material in place of rod-like glass fibers of the prior art. The sphere diameter is preferably selected approximately equal to the particle size of the conducting material particles contained in the conducting paste.

In accordance with another aspect of the present invention, the particle sizes of both the conducting material particles and the sphere diameter of the insulating material particles may be in the range of 6–10 μm.

In accordance with yet another aspect of the present invention, the conducting paste may comprise silver paste while the spacers may comprise glass balls.

DETAILED DESCRIPTION OF THE INVENTION

An embodiment of this invention will now be described by way of example with reference to the accompanying drawings.

Figure 1A:
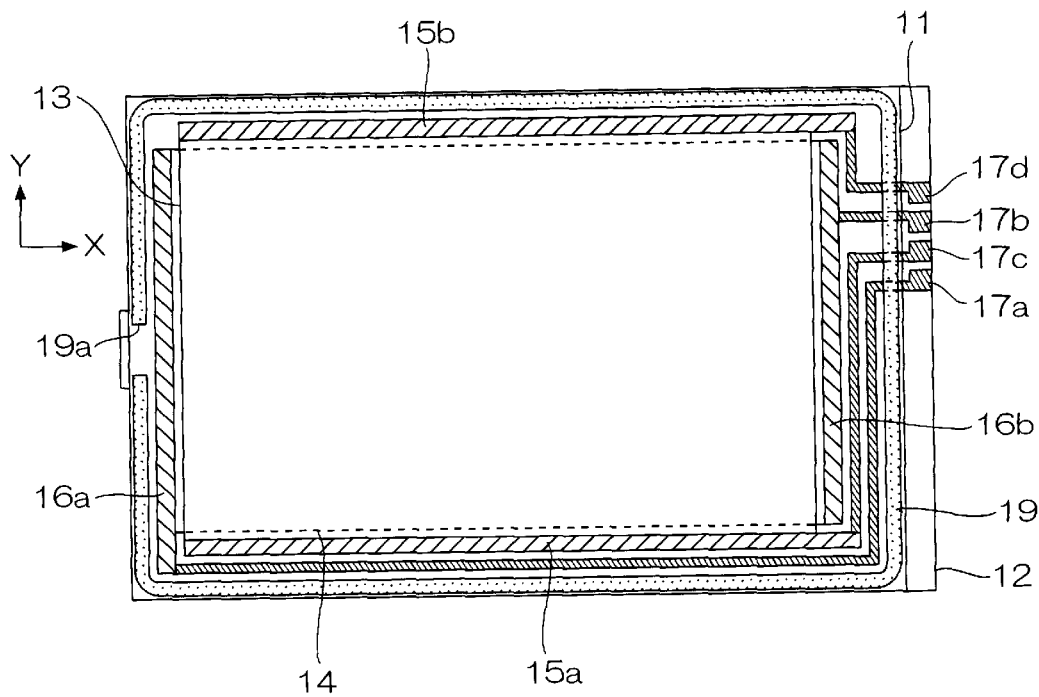
FIG. 1A is a plan view illustrating one embodiment of the touch panel according to this invention.
Figure 1B:
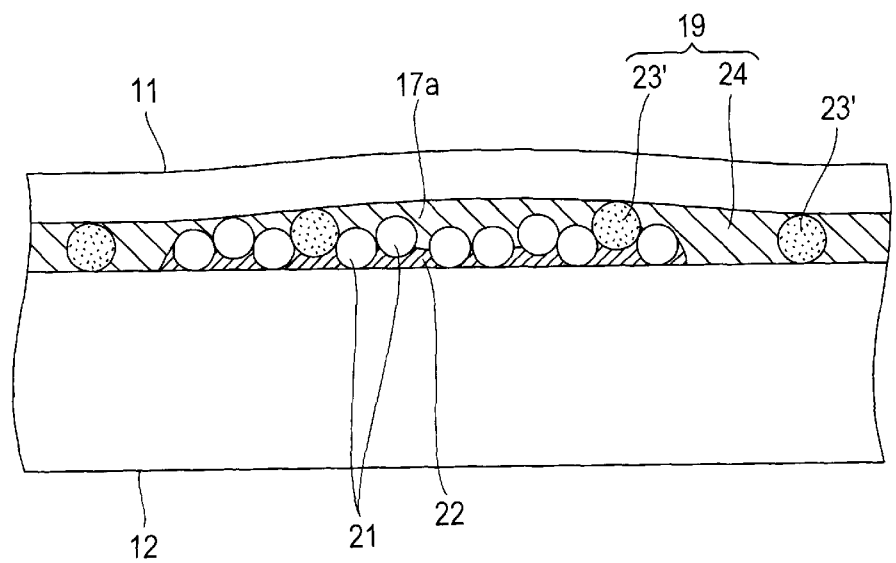
FIG. 1B is a diagrammatical view illustrating the principal portion of the touch panel.

FIGS. 1A and 1B show one embodiment of the resistance film system touch panel of the glass-glass type according to this invention, wherein FIG. 1A shows the general construction of the panel as viewed from the side of the control face; and FIG. 1B shows the principal portion of the panel.

Figure 2:
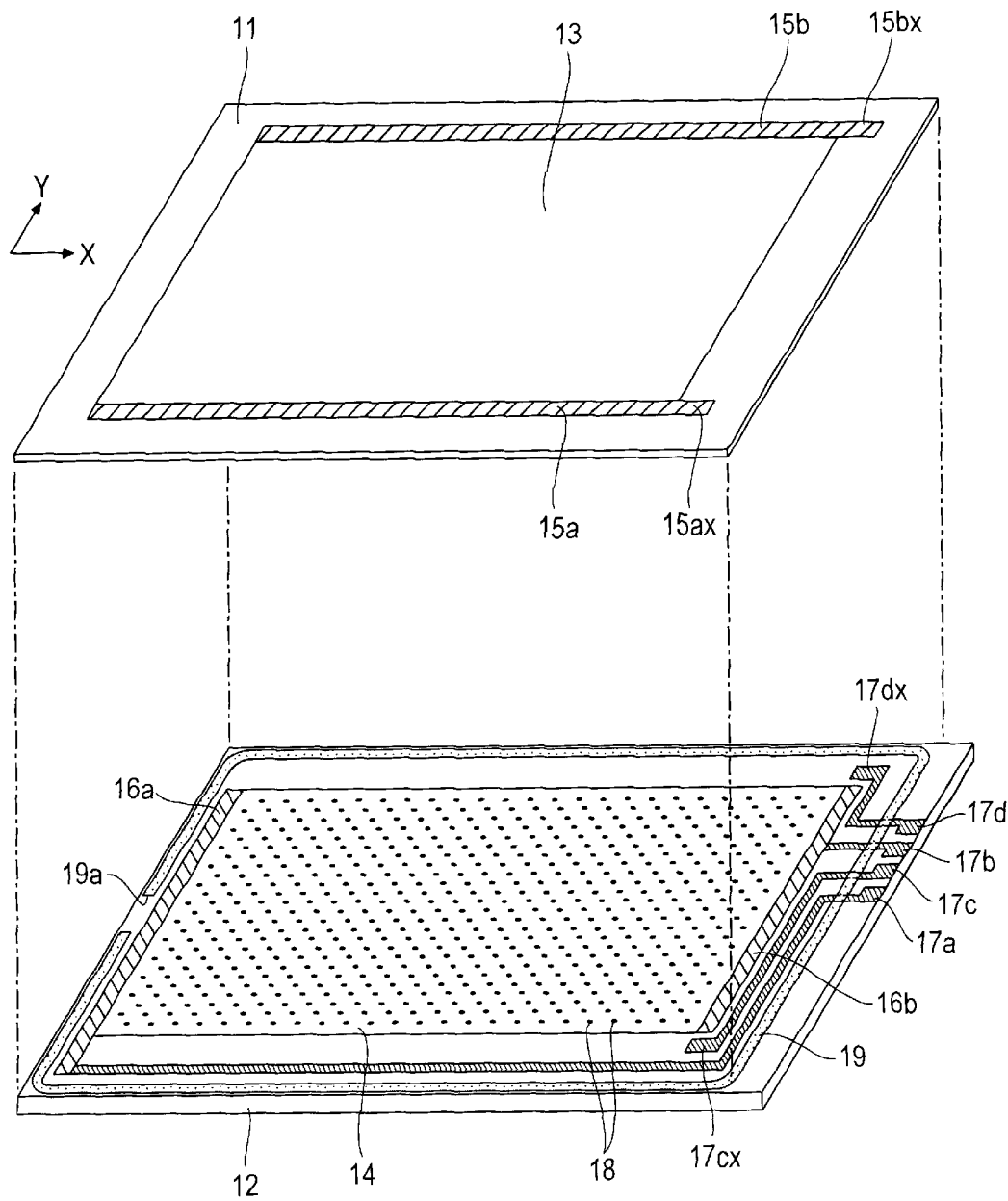
FIG. 2 is a perspective view showing the construction of a prior art touch panel in which the upper glass substrate side and the lower glass substrate side are shown in an exploded view.

The touch panel of this embodiment is of construction and configuration substantially identical to those of the prior art touch panel shown in FIG. 2 except for the spacers 23' incorporated in the seal 19. In FIGS. 1A and 1B, corresponding reference numerals are used for those components which correspond to components shown in of FIGS. 2 and 3, and those components will not be discussed again in detail.

In this embodiment, the spacers 23' are spherical in shape in contrast to the rod-like (columnar) spacers 23 of glass fibers in the prior art. The sphere diameter of these spacers 23' should be selected depending upon the spacing required between the upper glass substrate 11 and the lower glass substrate 12 around the periphery (sealed portion). The spacers 23' may be spherical particles of electrically insulating material, preferably glass balls which are incorporated in a thermosetting resin such as epoxy-based resin to produce a seal 19.

Figure 3:
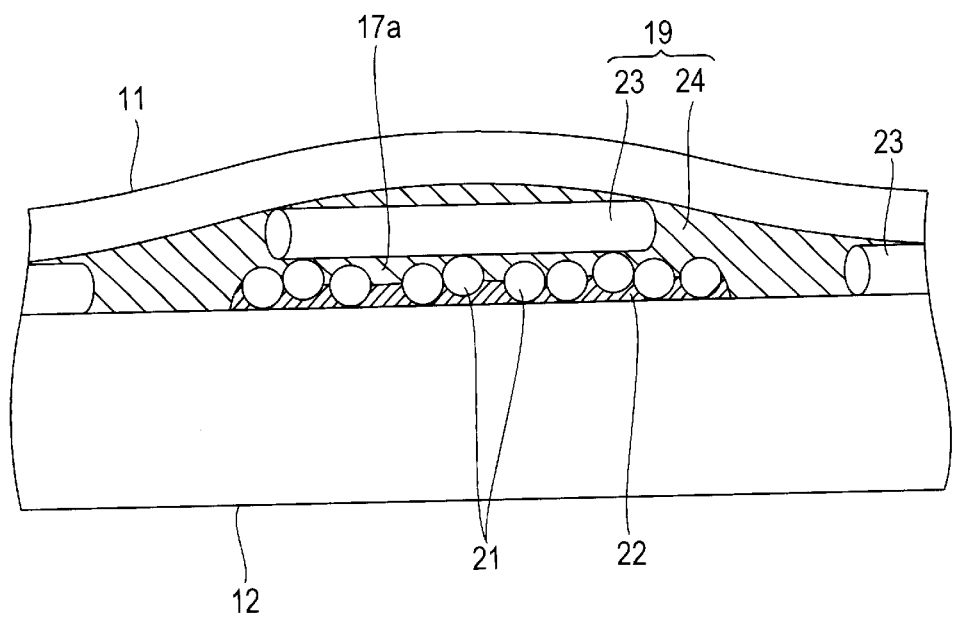
FIG. 3 is a diagrammatical view illustrating the intersecting portion (overlapping portion) of the seal and the lead-out pattern in the prior art touch panel.

FIG. 1B is an illustration showing the manner in which the upper glass substrate 11 is superposed on the lower glass substrate 12 after the seal 19 is applied to the latter, in which that portion of the lead-out pattern 17a intersecting the seal is diagrammatically shown, as in FIG. 3 illustrating the prior art example. The lead-out pattern 17a is formed of a silver paste.

Here, assuming that the spacing between the upper and lower glass substrates 11 and 12 around their peripheral sealed joint portion is 9 μm as in the case of the prior art shown in FIG. 3, the sphere diameter of the spacers 23' should also be 9 μm. On the other hand, the particle size of the silver particles 21 may be on the order of 6 μm, whereby the glass balls comprising the spacers 23' will jam in between the silver particles 21 of the lead-out pattern 17a cured by coated and fired, as shown in FIG. 1B.

Even in the most severe condition such as where the silver particles 21 have been fired in close contact with each other such that each one in each group of three silver particles 21 is located at a corresponding apex of an equilateral triangle in a plan view (as viewed from the top of FIG. 1B), if the glass ball spacers 23' have each jammed in between two of the adjoining silver particles, the height of that portion of the seal 19 intersecting the lead-out pattern 17a would be of the order, at most, of 16 μm in the example illustrated, whereby the difference in height between the bumps and dips on the seal which is defined by the difference in height of about 7 μm from the height of about 9 μm of those portions of the seal 19 not intersecting the lead-out pattern 17a which is determined substantially by the sphere diameter of the spacer 23' can be greatly reduced as compared with the difference in height of 11.5 μm in the prior art example.

In the case where the glass balls have jammed in between the silver particles 21 which have been fired in less close proximity to each other, the height of the seal would be lower than the maximum height of about 16 μm as mentioned above. It will thus readily be appreciated that overall height of those portions of the seal intersecting (overlapping) the lead-out patterns would be lower than 16 μm, even taking into account the probability of occurrence of portions subjected to the most severe condition as described above.

Accordingly, it is to be understood that the present invention provides for eliminating the problem with the prior art of cracking in the relatively thin upper glass substrate 11 due to the bumps formed on the intersections of the seal with the lead-out patterns.

Such effect is due to the fact that the sphere diameter of the spacers 23' is substantially equal to the particle size of the silver particles 21. In the touch panel of the type concerned, the particle size of the silver particles 21 is typically in the range of 6–10 μm. Accordingly, the sphere diameter of the spacers 23' should also be selected to be in the range of 6–10 μm.

While a silver paste containing silver particles is used as a conducting paste in the example described above, it is obvious that any conducting paste containing conductor particles other than silver particles may be used.

It is to be noted that many dot spacers 18 having a diameter (φ) of 40–80 μm and a height of 1–3 μm are formed in an array over the transparent conducting film 14 of the lower glass substrate 12 by print-applying UV ink to the film and UV curing it.

Although it may be prone to be promptly judged that the present invention is prima facie nothing more than a simple substitution of glass balls for rod-like glass fibers to be incorporated in a seal, it is believed to be difficult for even those person skilled in the art to conceive the idea of needing to substitute the spacers before no presence or existence of investigation of the cause why the incidence of cracks occur in the glass substrate associated with the prior art.

In addition, it would have been difficult to anticipate the present inventive concept, unless one could find out the problems with the prior art that even if rod-like spacers were placed on silver particles contained in a silver paste and fire-cured, they would hardly dig in between the silver particles, so that the height of that portion of the seal intersecting the lead-out patterns could not be significantly reduced from the maximum height corresponding to the sum of the sphere diameter of the silver particles and the diameter of the spacers.

Moreover, this invention allows for greatly reducing the difference in height between the bumps and dips formed on the seal due to the existence of the intersecting portions of the seal and the lead-out pattern as compared with the prior art, whereby according to the present invention the probability of occurrence of the glass cracking can be reduced to the level of 0.1% from about the level of 2% probability associated with the prior art. This in turn allows for reducing the percentage defective due to the malfunction only from 6% for the prior art to 4% to thereby significantly improve the yield, which leads to enhancement of the industrial value of the product manufactured according to the teaching of this invention.

What is claimed is:

1. A touch panel comprising a pair of glass substrates each having a transparent conducting film formed on a one side surface, said glass substrates disposed with the transparent conducting films facing each other and bonded together around the peripheries by a seal having spacers of insulating material incorporated therein, in which lead-out patterns extended out of the touch panel from electrodes provided on said transparent conducting films intersect said seal; characterized in:

that said lead-out patterns are formed from a fired conducting paste containing particles of conducting material; and that said spacers comprise spherical particles of insulating material, the sphere diameter of said spacers being selected to be approximately equal to the particle size of said conducting material particles.

2. The touch panel according to claim 1 wherein the particle sizes of both said conducting material particles and said insulating material particles are selected to be in a range of 6–10 μm.

3. The touch panel according to claim 2 wherein said conducting paste comprises silver paste while said spacers comprise glass balls.

4. The touch panel according to claim 1 wherein said conducting paste comprises silver paste while said spacers comprise glass balls.

* * * * *